United States Patent [19]
Gibson

[11] Patent Number: 5,791,237
[45] Date of Patent: Aug. 11, 1998

[54] GARLIC PRESS

[75] Inventor: Jeremy H. Gibson, Eastlake, Ohio

[73] Assignee: Faye Fong Chen, Taipei, Taiwan

[21] Appl. No.: 962,818

[22] Filed: Nov. 3, 1997

[51] Int. Cl.[6] .............. A47J 19/06; B30B 9/02; B30B 9/06; B30B 15/00
[52] U.S. Cl. .............. 99/510; 99/495; 100/112; 100/125; 100/234; D7/666
[58] Field of Search .............. 99/495, 506, 508, 99/509, 510, 511; 100/112, 125, 234, 99, 116, 243; 241/167, 169.1, 273.3, 169.2, 95; D7/665, 666

[56] References Cited

U.S. PATENT DOCUMENTS

| | | | |
|---|---|---|---|
| D. 372,642 | 8/1996 | Baines | D7/665 |
| 4,348,950 | 9/1982 | Harris | 99/510 |
| 4,537,123 | 8/1985 | Holcomb | 99/510 X |
| 4,714,205 | 12/1987 | Steinko | 241/95 |
| 5,101,720 | 4/1992 | Bianchi | 100/112 X |
| 5,165,335 | 11/1992 | Bianchi | 99/495 X |
| 5,303,640 | 4/1994 | Gaber et al. | 99/495 |
| 5,370,044 | 12/1994 | Lackie | 100/125 X |
| 5,463,941 | 11/1995 | Gibson | 99/495 |
| 5,467,699 | 11/1995 | Laib | 99/495 |
| 5,513,562 | 5/1996 | Moor | 100/112 |
| 5,529,252 | 6/1996 | Baines | 241/95 |
| 5,562,256 | 10/1996 | Wolman et al. | 241/169.1 |

Primary Examiner—Timothy F. Simone
Attorney, Agent, or Firm—James A. Lucas

[57] ABSTRACT

A garlic press is described which utilizes a unique grater plate comprising a plurality of spaced apart drain holes and a plurality of conical projections. A corresponding press plate contains numerous recesses to receive the projections to facilitate the pressing of the garlic by penetrating the skin of the garlic clove. The garlic press may use a clean-out tool which includes a plurality of clean-out pins for engaging the drain holes in the grater plate. The tool can be stored by clipping it to one of the handles of the press when not in use. The pins of the clean out tool are a fixed length between three in four times of thickness of the grater plate. Alternatively, the clean out tool can be affixed to the press unit opposite the press plate with the top presser unit rotated about 270 degrees from a closed position to a fully open position, allowing the clean out pins to enter through the drain holes. In this alternative, the length of the pins are preferably graduated with the pins close to the pivot being shorter and pins furthest from the pivot being longer for more effective cleaning.

18 Claims, 4 Drawing Sheets

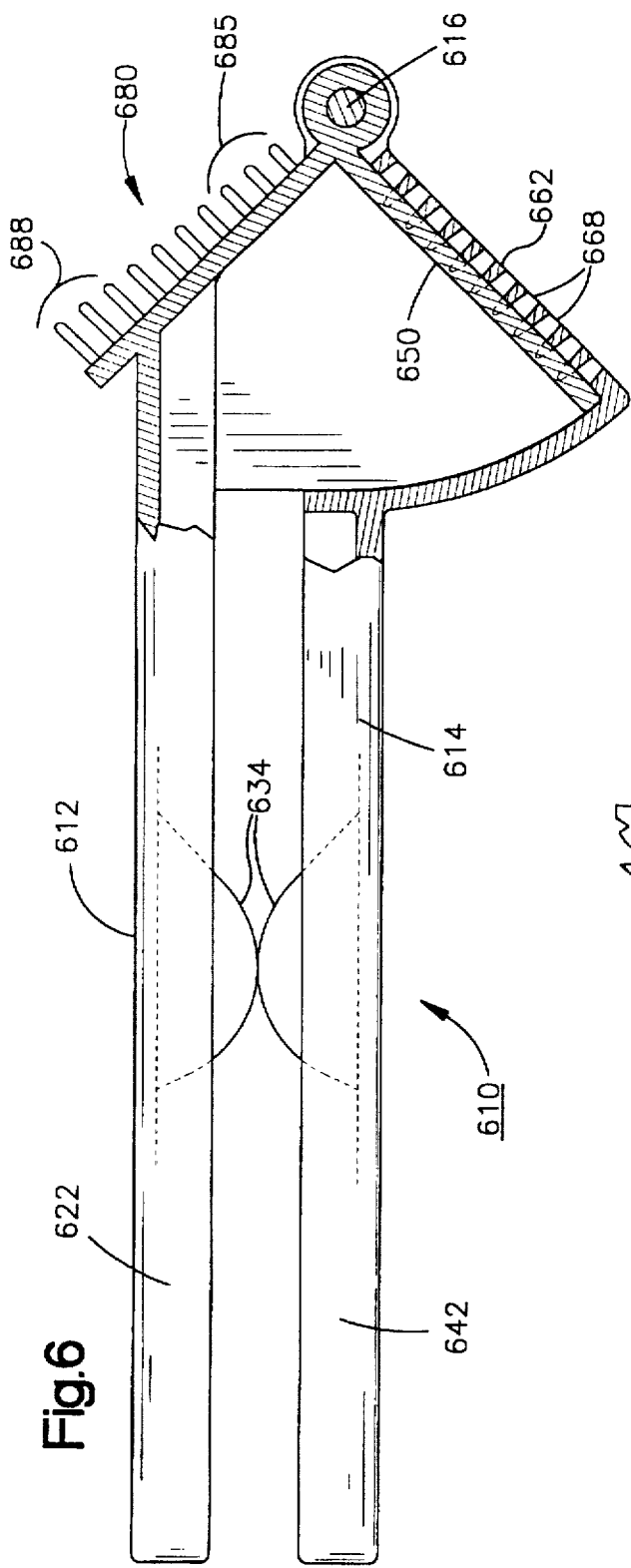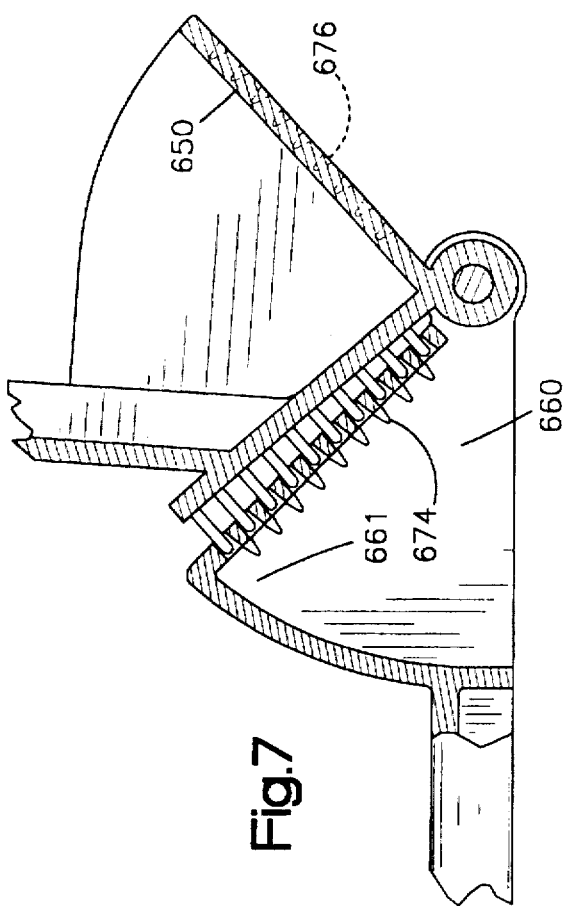

GARLIC PRESS

FIELD OF THE INVENTION

This invention relates to a device useful in squeezing bulbs or cloves to extract juices, oil, or pulp therefrom. More particularly, the invention relates to a hand-held device for squeezing cloves of garlic, and to a tool useful in cleaning the device after use.

BACKGROUND OF THE INVENTION

A variety of consumer products are commercially available for squeezing cloves of garlic. Many of these devices are hand-held and employ a commonality of parts and function, namely that they comprise two elements which are hinged together at one end. Typically, these devices have a clove holder and a press near the hinged end, and have handles at the other end which are squeezed together to compress the clove through holes in the holder forcing the pulp and oil out of the clove.

Some of these devices include a clean-out tool to clear the pulp from the holes in the holder. The clean out tool may comprise an integral part of the clove press, or may be a separate tool.

All these prior art clove presses have certain drawbacks which limit their function and usefulness. One common fault is the amount of pressure required to force the clove through the holes. The required force can easily exceed the ability of the user. It also can cause noticeable flexing, with a potential of breaking the handles when squeezed together. Another problem is the effectiveness in cleaning the garlic press after use, whether or not a clean-out tool is used.

Typically, the skin of the garlic clove is very tough thus making it difficult to squeeze the pulp of the clove through the skin. Thus, the skin preferably is removed before squeezing.

SUMMARY OF THE INVENTION

It is one objective of the present invention to provide a more effective means of cleaning a garlic press after use;

Another objective of the present invention is to more readily extract the pulp from a garlic clove without the necessity of removing the skin.

Yet another objective of the present invention is to puncture the clove with the clove press to facilitate removal of the pulp by pressing.

These and other objectives which will become apparent upon reading of the following description, are achieved by use of a garlic press comprising a top presser unit, and a bottom bearing unit. The top presser unit has a first end terminating in an elongated handle, and a second end, with a press plate intermediate the two ends in proximity to the second end. The bottom bearing unit has a first end terminating in an elongated handle, a second end, and a garlic basket in proximity to the second end to receive the press plate. The basket has a bottom comprising a perforated grater plate. The second end of the bottom bearing unit is joined to the second end of the top presser unit by pivot means. The grater plate comprises first and second generally planar surfaces, and contains a plurality of drain holes spaced from one another, extending through the plate from the first surface to the second surface. The first surface faces the press plate and includes a plurality of conical projections. These projections are in between, and spaced apart from the drain holes. The press plate has a plurality of conical recesses therein, each recess positioned to receive one of the conical projections when the press is closed. The depth and the dimension of the recesses are slightly greater than the height and dimensions of each of the conical projections. The holes in the grater plate are tapered from a smaller opening at the first surface to a larger opening at the second surface. The grater plate preferably is parallel with respect to the elongated handles. Alternatively, the grater plate can form in angle of between about 30 degrees and about 60 degrees with respect to the handles. The press plate forms a corresponding angle with respect to the handles. It is pivotally joined to the top presser unit to permit it to conform to the angle of the grater plate.

The presser unit includes a separate clean out means containing a plurality of pins conforming to the holes in the grater plate, said pins having a length between approximately 3 and 4 times the thickness of the grater plate. Alternatively, the press plate can be fixedly joined to the top presser unit, and a plurality of clean out pins can be mounted on the opposite side of the unit axially from the presser plate whereupon pivotal rotation of the top handle about 270 degrees around the pivot allows the pins to enter the holes in the grater plate to clean out the holes. The pins have a graduated length of approximately 1.5 times the thickness of the grater plate closest to the pivot, to between about 3 and about 4 times the thickness of the grater plate furthest from the pivot. When the separate clean out tool is not being used, it can be secured to the press between elongated handles thereof.

The garlic press of the present invention has a grater plate with drain holes extending therethrough, and a press plate. Means are provided for puncturing the skin of a garlic clove to facilitate the removal of the oil and pulp therefrom when the clove is compressed. This means comprises a plurality of skin puncturing projections on one of the grater plate or the press plate and corresponding recesses in the other of the plates, said recesses corresponding in shape to the projections. When the plates are pressed together, clearance is provided between each projection and the corresponding recess. Each of the projections is in the shape of the cone, and each recess is shaped to receive the cone. The grater press has a first surface facing the press plate and a second surface, with the drain holes spaced from one another and joining the two surfaces. The cones are located on one surface of the grater plate intermediate the drain holes. The drain holes have a slightly frusto-conical shape, with the diameter of each hole increasing from the first surface to the second surface.

The garlic press of the present invention comprises a top presser unit having a first end terminating in an elongated handle and a second end terminating in a pair of laterally spaced lugs containing inwardly facing pivot pins. A press plate holder is intermediate the first and second ends in proximity to the second end of the presser unit. The press plate holder comprises a pair of spaced apart, downwardly projecting lugs provided with opposed notches. A plunger contains two opposed pins that are pivotally engaged and secured in the notches. The plunger terminates in a press plate having a generally planar surface. The press plate contains a plurality of recesses extending into the press plate from the surface thereof. The press also includes a bottom bearing unit having a first end comprising an elongated handle and a second end including an upwardly extending lug terminating in a pair of spaced apart, downwardly facing notches. These notches engage the downwardly facing pivot pins of the presser unit to form a pivot. A basket is contained in the bottom bearing unit adjacent the second end thereof. The basket is located immediately below the plunger to receive the plunger when the handles are squeezed together. The bottom of the basket comprises a grater plate including a plurality of spaced-apart holes extending therethrough. A plurality of cones extends up therefrom toward the plunger and cooperate with the recesses in the plunger. The recesses are conically shaped and are positioned to receive the cones of the grater plate when the handles are pressed together. Each recess has a depth which is slightly greater than the height of the corresponding cone, and a diameter which is slightly larger than the maximum diameter of the cone. The grater plate and the press plate are generally parallel to the elongated handles. The press includes a separate clean out means including a plurality of elongated pins having a length between about three and about four times the thickness of the grater plate. The placement and spacing of the pins conforms to the holes in the grater plate. The separate clean out means preferably is secured to one of the handles of the press when not in use.

BRIEF DESCRIPTION OF THE DRAWINGS

FIG. 3 is a partial cut away in view taken along lines 3—3 of FIG. 1.;

FIG. 4 is an enlarged cross-sectional view taken along lines 4—4 of FIG. 3;

FIG. 6 is an elevation view, partially in cross-section of a variation of the press;

FIG. 7 is a part is partial cross-sectional view of the press of FIG. 6 in the clean-out mode.

DETAILED DESCRIPTION OF THE INVENTION

Figure 1:
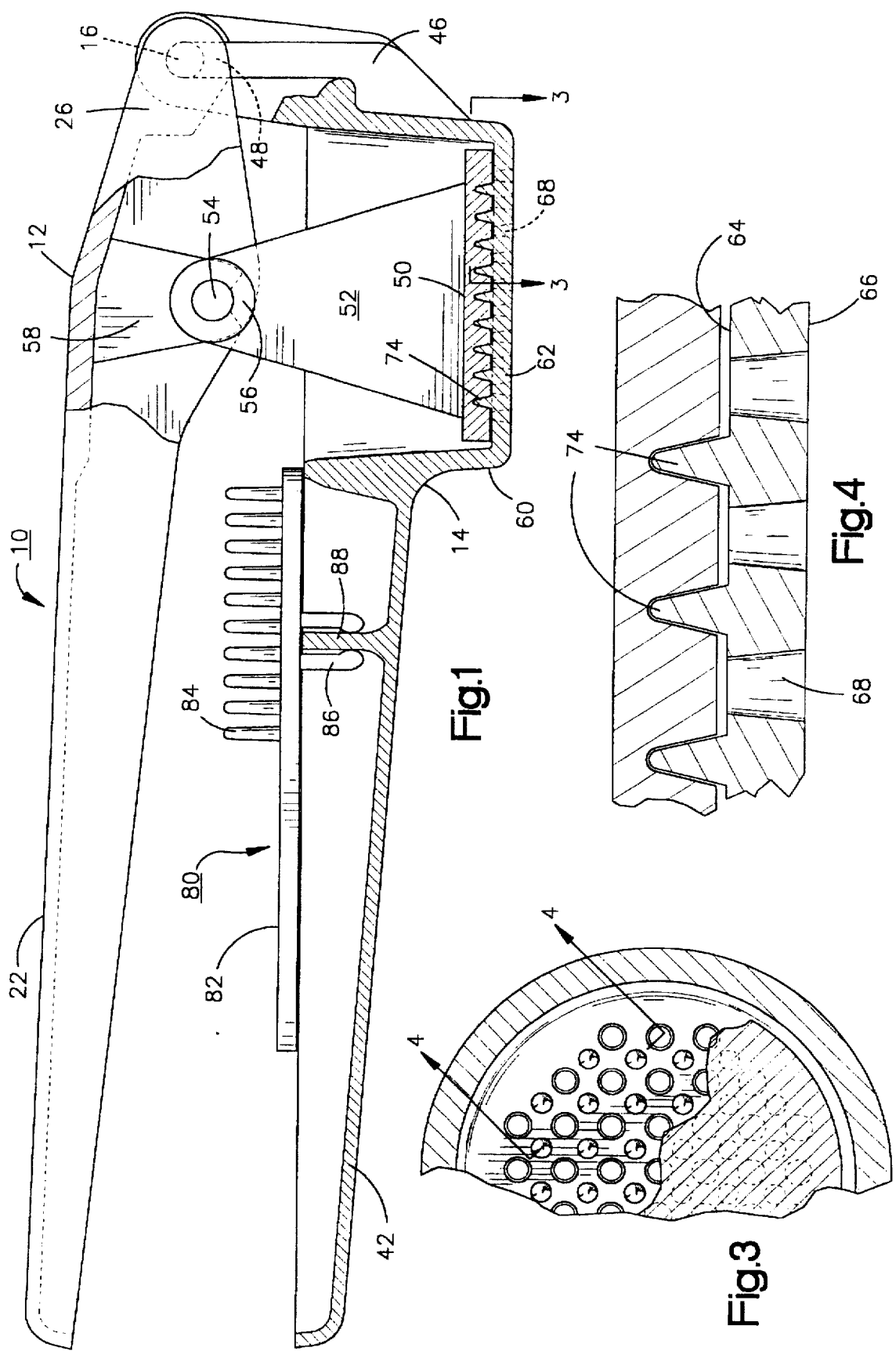
FIG. 1 is an elevation the view of a press, partially in cross-section.
Figure 2:
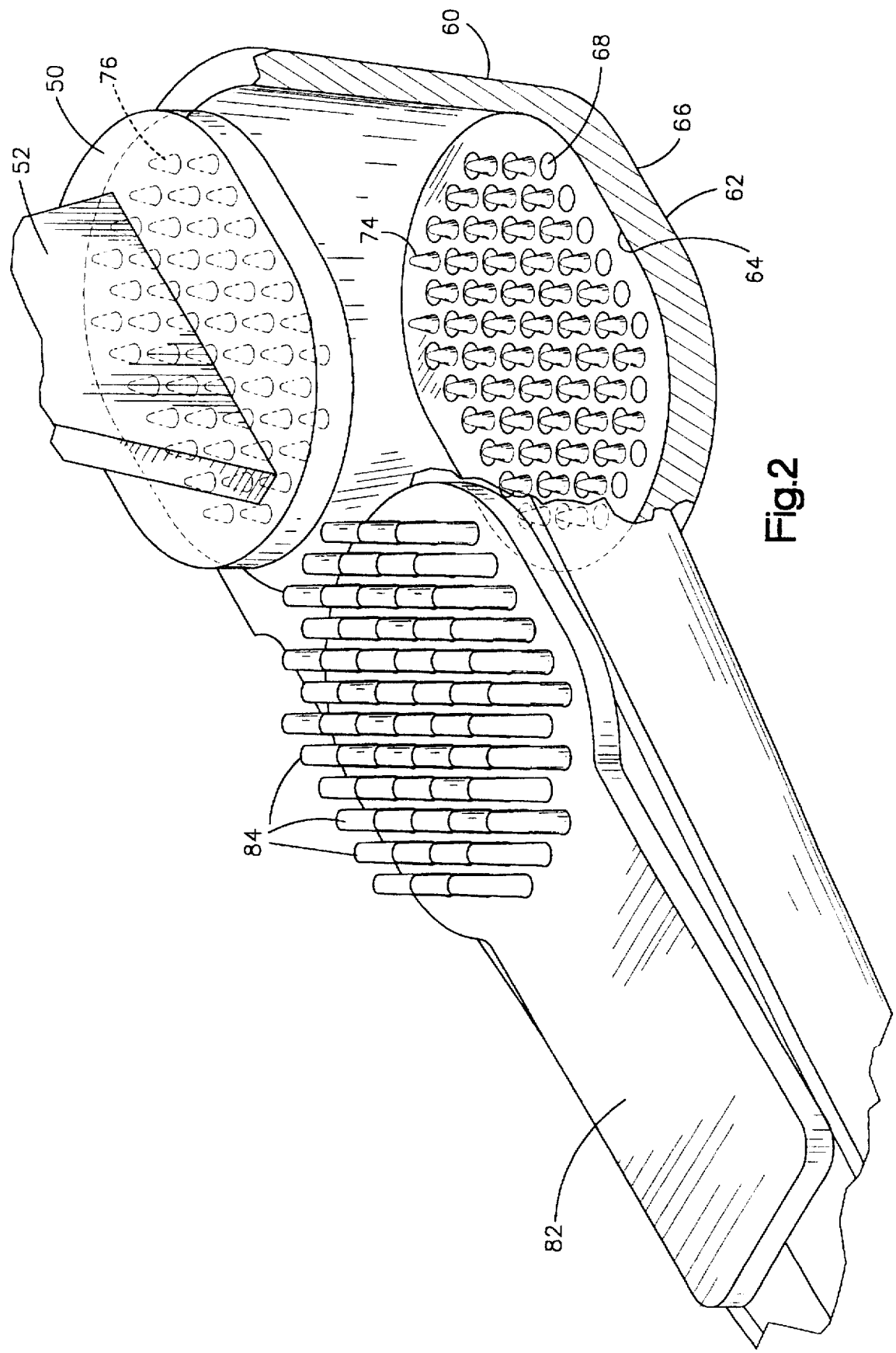
FIG. 2 is a partial perspective view of the press of FIG. 1.

Referring now to the drawings, FIG. 1 is an elevation view, partially in cross section, showing a garlic press 10 comprising a presser unit 12 and a bearing unit 14 pivotally joined at pivot pins 16 (shown in outline). The presser unit 12 is generally elongated with a first end forming an elongated U-shaped handle 22 and a second end formed into a pair of lugs 26 spaced laterally apart, each lug including one pivot pin 16. The pivot pins 16 face one another and are spaced apart in axial alignment. The bearing unit 14 likewise is generally elongated with a first end forming a U-shaped handle 42 and a second end 44 which terminates in an upwardly extending lug 46. The lug 46 terminates in a pair of spaced-apart notches 48. The lug 46 of the bearing unit fits between the lugs 26 of the presser unit with a notches 48 engaging the pivot pins. During the assembly, each of the notches is lightly crimped together around the respective pivot pin to permit the two units to freely pivot without separation.

The presser unit includes handle 22 which is generally U-shaped for strength. The unit includes a press plate 50 joined to a plunger 52. The plunger contains two opposed pivot pins 54. These pivot pins engage and are secured in notches 56 in a pair of lugs 58 extending downwardly from within the presser unit.

The bearing unit 14 includes a generally oval basket 60 into which a clove of garlic (not shown) is placed for pressing. The bottom of the basket comprises a grater plate 62 having two generally planar surfaces, a top surface 64 and a bottom surface 66. The grater plate contains a plurality of holes 68 through which the pulp passes as a garlic is pressed. As shown in greater detail in FIG. 4, each of the holes 68 is preferably frusto-conical in shape with a taper from a smaller diameter at the top surface to a larger diameter at the bottom surface of the plate. This minimizes clogging of the holes and facilitates machining of the plate during manufacture. Typically, the use of about 58 holes, each having a diameter of about 2 mm has been found to be satisfactory for this purpose.

A plurality of projections 74, shown in the shape of cones, extend from the top planar surface 64 toward the press plate 50. The projections are preferably equidistantly spaced between the drain holes. The press plate 50 is generally planar and includes a plurality of recesses which correspond in shape, size and position to the projections 74 on the grater plate. Each recess, as shown in FIG. 4, has a depth which is incrementally greater than the height of the corresponding projection. Likewise, the other dimensions of the recess are slightly greater than those of the projections, thereby enabling the planar surface of the press plate to fully contact the corresponding surface of the grater plate to maximize the degree to which the garlic clove is converted to pulp. The use of about 50 conical projections, each having a height of about 2.3 mm. and a base diameter of about 1.5 mm, spaced about 3.3 mm. apart from one another, has been found to work well. Corresponding recesses having a conforming conical shape, and sized to give a clearance between the recess and the cone approximating about 0.8 mm. when the press is closed, may be employed.

Figure 5:
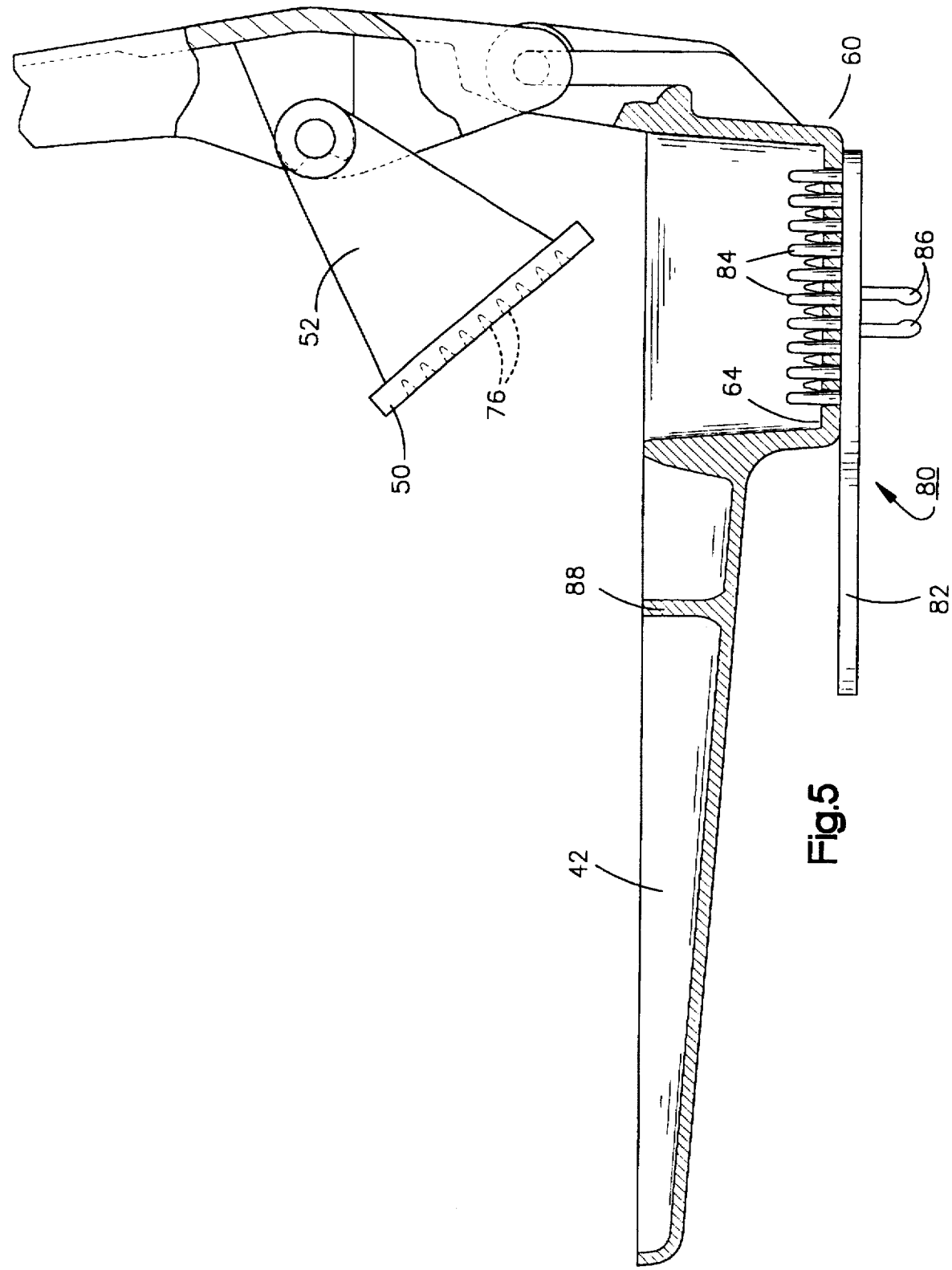
FIG. 5 is a side elevation of the press of FIG. 1, in the clean-out mode.

The garlic press shown in FIG. 1 preferably includes a clean-out means comprising a tool 80 made of a material such as plastic or lightweight metal having a handle 82 and a plurality of elongated pins 84. FIG. 5 shows the clean-out tool in position to remove the pulp of a garlic clove from the holes of the grater plate. The clean-out tool can be easily stored between the two handles, by snapping the two prongs of clip 86 on to the flange 88 extending between the two legs of the U-shaped handle 22.

A modification of the garlic press of the present invention is shown in FIGS. 6 and 7. The end of the presser unit, and the end of the bearing unit opposite the pivot form elongated handles 622, 642. The press comprises a presser unit 612 and a bearing unit 614, joined together at pivot pin 616.

The presser unit 612 includes a press plate 650 in proximity to the pivot 616. The press plate forms an angle of between about 30 degrees and about 60 degrees with respect to the axis of the presser unit. The bearing unit 614 contains a basket 660 into which a garlic clove is placed to be squeezed. The bottom of the basket forms a grater plate 662 at an angle with respect to the axis of the handle which corresponds to the angle of the press plate whereby the plates are parallel to one another when the handles of the press are squeezed together. Lugs 634 contact one another to prevent unnecessary flexing of the handles when the press is fully closed.

A plurality of projections 674, shown in the shape of cones, extend from the grater plate 664 toward the press plate 650. The projections are preferably spaced an equal distant apart between the drain holes 668. The press plate 650 is generally planar and includes a plurality of recesses 676 (shown in dotted lines) which correspond in shape, size, and position to the projections 674 on the grater plate. Each recess has a depth which is slightly greater than the height of the corresponding projection. Likewise, the other dimensions of the recesses are slightly greater than those of the conical projection. As previously stated, this enables the planar surface of the press plate to fully contact the corresponding surface of the grater plate to maximize the compression of the garlic cloves to extract the pulp.

The clean out tool 680 is secured to the presser unit 612 opposite the press plate 650, and includes a plurality of clean out pins 685, 688 positioned to conform to the drain holes 668 in the grater plate 662. To more effectively remove the garlic pulp from the drain holes, the pins are graduated in length whereby the pins 685 closest to the pivot 616 are about 1½ to 3 times of the thickness of the grater plate, and the pins 688 furthest from the pivot pin 616 are about 3 to 4 times the thickness and of the plate. Because of the angle of the basket, pulp is more difficult to remove from the deepest part of the basket 660, a task which is greatly simplified by the longer pins pushing the pulp closer to the top of the basket where removal, manually or by washing is facilitated. The pins preferably are tapered to facilitate their entry into the drain holes and for ease of fabrication where, for example, the clean out tool is produced by injection molding. The tapered pins can be slightly curved, if desired, to conform generally to the radius through which the pins move as the presser unit is rotated through an arc of about 270 degrees from the closed position shown in FIG. 6 to the open clean out position shown in FIG. 7. Instead of having a presser plate which has a fixed relationship to the grater plate, the presser plate can be pivotally connected to the presser unit in the manner similar to that shown in U.S. Pat. No. 5,463,941, the teachings of which are incorporated herein.

The garlic press of the present invention can be fabricated from any material which is deemed to be suitable for the intended purpose. For example, all of the components can be cast or otherwise fabricated from a suitable lightweight metal such as aluminum or other metal such as stainless steel. Certain components including the clean-out tool may be molded from a rigid polymer such as polyethylene, polypropylene, polyurethane, Delrin or Nylon. Generally speaking, the materials of construction should be able to withstand repeated compressive forces during use, and should be dishwasher safe.

While the invention has been described in connection with specific embodiments thereof, it is evident that many alternatives, modifications and variations will be apparent to those skilled in the art in light of the foregoing teachings. Accordingly, the invention is intended to embrace all such alternatives, modifications and variations that fall within the spirit and scope of the appended claims.

What is claimed is:

1. A garlic press for extracting the pulp and oil from a garlic clove, said press comprising a top presser unit having a first end terminating in an elongated handle, and a second end, and a press plate intermediate the two ends in proximity to the second end, a bottom bearing unit having a first end terminating in an elongated handle, a second end, and a garlic basket in proximity to the second end to receive the press plate, the basket having a bottom comprising a perforated grater plate, the second end of the bottom bearing unit joined to the second end of the top presser unit by pivot means, the improvement wherein said grater plate comprises first and second generally planar surfaces, and contain a plurality of drain holes spaced from one another, extending through the plate from the first surface to the second surface, the first surface facing the presser plate including a plurality of conical projections on the first surface intermediate and spaced apart from the drain holes and the press plate having a plurality of conical recesses therein, each recess positioned to receive one of the conical projections when the press is closed.

2. The garlic press according to claim 1 wherein the depth and the dimensions of the recesses are slightly greater than the height and the dimensions of each of the conical projections.

3. The garlic press according to claim 1 wherein the drain holes in the grater plate are tapered from a smaller opening at the first surface to a larger opening at the second surface.

4. The press according to claim 1 wherein the grater plate forms an angle of between about 30 degrees and about 60 degrees with respect to the first and the second elongated handles, and the press plate forms a corresponding angle with respect to the handles.

5. The press according to claim 4 wherein the press plate is pivotally joined to the top presser unit to conform to the angle of the grater plate.

6. The press according to claim 4 wherein the presser unit further including separate clean out means containing a plurality of pins conforming to the holes in the grater plate said pins having a graduated length from approximately 1.5 times the thickness of the grater plate to between about 3 and about 4 times the thickness of the grater plate, with the shorter pins serving to clean out the holes closest to the pivot means and the longer pins serving to clean out the holes furthest from the pivot means.

7. The press according to claim 4 wherein the press plate is fixedly joined to the top presser unit, and the presser unit further includes a plurality of clean-out pins mounted thereon on the opposite side of the presser unit axially from said press plate whereupon pivotal rotation of the top handle about 270 degrees around the pivot means allows the clean out pins to enter the holes in the grater plate to clean out the holes, the pins having a graduated length from approximately 1.5 times the thickness of the grater plate closest the pivot means to between about 3 and about 4 times the thickness of the grater plate furthest from the pivot means.

8. The press according to claim 1 wherein the grater plate is approximately parallel to the first and second elongated handles, and the press plate is pivotally joined to the top presser unit.

9. The press according to claim 8 further including a separate clean out means having clean out pins corresponding to the holes in the grater plate, said pins having a thickness between about 3 and about 4 times the thickness of said grater plate.

10. The press according to claim 9 wherein the separate clean out means is secured between the elongated handles for storage when not in use.

11. In a garlic press having a grater plate with drain holes therethrough and a presser plate, means for puncturing the skin of a garlic clove to facilitate the removal of the pulp from the clove when compressed, said means comprising a plurality of skin puncturing projections on one of the grater plate and the press plate and corresponding recesses on the other of the plates, said recesses corresponding in shape to the projections, and providing, when the two plates are pressed together, with clearance between each projection and the corresponding recess.

12. In the garlic press according to claim 11, each projection being in the shape of a cone and each recess being conically-shaped to receive the cone.

13. In the garlic press according to claim 11, the grater press having a first surface facing the press plate and a second surface, with the drain holes being spaced from one another and joining the two surfaces, the cones being located on the first surface of the grater plate intermediate the drain holes.

14. In the garlic press according to claim 12, the drain holes having a frusto-conical shape with the diameter thereof increasing from the first surface to the second surface.

15. A garlic press comprising a top presser unit having a first end terminating in an elongated handle and a second end terminating in a pair of laterally spaced lugs containing inwardly facing pivot pins, a press plate holder intermediate the first and second ends in proximity to the second end of the top presser unit, said press plate holder comprising a pair of spaced apart downwardly projecting lugs provided with opposed notches, a plunger containing two opposed pins pivotally engaging and secured in the notches, the plunger terminating in a press plate having a generally planar surface, the press plate containing a plurality of recesses extending in to the press plate from the surface thereof,

- a bottom bearing unit having a first end comprising an elongated handle and the second end including an upwardly extending lug terminating in a pair of spaced apart, downwardly facing notches engaging the inwardly facing pivot pins of the presser unit to form a pivot;
- a basket in the bottom bearing unit adjacent to the second end thereof, located immediately below the plunger for receiving the plunger when the handles are squeezed together, the bottom of the basket comprising a grater plate including a plurality of spaced apart holes extending therethrough, and a plurality of cones extending up therefrom toward the plunger and cooperating with the recesses in said plunger, shaped and positioned to receive the cones of the grater plate when the handles are pressed together, each recess having a depth which is slightly greater than the height of the corresponding cone and a diameter which is slightly larger than the maximum diameter of the cone.

16. The garlic press according to claim 15 wherein the grater plate is generally parallel with respect to the elongated handle of the bottom unit.

17. The garlic press according to claim 15 further including a separate clean out means including a plurality of elongated pins having a length between about 3 and about 4 times the thickness of the grater plate, the placement and spacing of said pins conforming to the holes in the grater plate.

18. The garlic press according to claim 17 wherein the separate clean out means is secured to one of the handles for storage when not in use.

* * * * *